United States Patent
Pinto (10) Patent No.: US 7,099,337 B2
(45) Date of Patent: Aug. 29, 2006

(54) MECHANISM FOR IMPLEMENTING CLASS REDIRECTION IN A CLUSTER

(75) Inventor: Oscar P. Pinto, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 09/996,766

(22) Filed: Nov. 30, 2001

(65) Prior Publication Data

US 2003/0103455 A1 Jun. 5, 2003

(51) Int. Cl.
*H04L 12/28* (2006.01)
*G06F 11/00* (2006.01)
*G06F 15/173* (2006.01)

(52) U.S. Cl. ............... 370/400; 370/217; 370/392; 370/410; 709/239

(58) Field of Classification Search ........... 370/389, 370/392, 396, 398, 400, 401, 200–202, 230, 370/235, 351, 395.3, 395.31, 395.32, 250, 370/428; 718/100, 105
See application file for complete search history.

(56) References Cited

U.S. PATENT DOCUMENTS

| | | | |
|---|---|---|---|
| 6,587,950 B1 | 7/2003 | Shah et al. | |
| 6,591,309 B1 | 7/2003 | Shah | |
| 6,694,361 B1 | 2/2004 | Shah et al. | |
| 6,725,386 B1 | 4/2004 | Shah | |
| 6,738,818 B1 | 5/2004 | Shah | |
| 6,757,242 B1 | 6/2004 | Wang et al. | |
| 6,766,470 B1 | 7/2004 | Shah | |
| 6,772,320 B1 | 8/2004 | Raj | |
| 6,810,418 B1 | 10/2004 | Shah et al. | |
| 2002/0133633 A1 | 9/2002 | Arvind | |
| 2003/0021223 A1* | 1/2003 | Kashyap | 370/217 |
| 2003/0061367 A1 | 3/2003 | Shah | |
| 2003/0065775 A1 | 4/2003 | Aggarwal | |

OTHER PUBLICATIONS

Shah et al., "A Mechanism For Reporting Topology Changes To Clients In A Cluster"., U.S. Appl. No. 09/942,608., Intel Corporation.
Pinto et al., "A Mechanism For Managing Incoming Data Messages IN A Cluster"., U.S. Appl. No. 09/994,779., Intel Corporation.
Raj., "Method And Device For Discovering Round Trip Delays Between Nodes In An Infiniband Cluster"., U.S. Appl. No. 09/669,668., Intel Corporation.
Shah et al., "A Cluster With Multiple Paths Between Hosts And I/O Controllers"., U.S. Appl. No. 09/450,381., Intel Corporation.

(Continued)

*Primary Examiner*—Ricky Q. Ngo
*Assistant Examiner*—Venkatesh Haliyur
(74) *Attorney, Agent, or Firm*—Rob Anderson (57) ABSTRACT

A mechanism is provided at a host node to implement redirection for Class Managers that do not reside on the host node in order to process incoming data messages accordingly in a switched fabric for scalable solutions.

19 Claims, 8 Drawing Sheets

OTHER PUBLICATIONS

Shah., "System And Mthod For Providing Dtailed Path Information To Clients"., U.S. Appl. No. 09/694,492., Intel Corporation.

Teitenberg et al., "Method And Apparatus For Distributing Events Among Multiple Channel Drivers"., U.S. Appl. No. 09/654,069., Intel Corporation.

Shah et al., "Path Removal For Highly Connected Clusters"., U.S. Appl. No. 09/654,491., Intel Corporation.

Shah., "Method And Apparatus For Determining Multiple Instances Of The Same Type Of Service Agent"., U.S. Appl. No. 09/653,585., Intel Corporation.

Shah., "Dynamic Removal Of A Driver Stack When A Parent Driver Uses A Child Driver"., U.S. Appl. No. 09/631,873., Intel Corporation.

Shah., "Delaying Loading Of Host-Side Drivers For Cluster Resources To Avoid Communication Failures"., U.S. Appl. No. 09/608,632., Intel Corporation.

* cited by examiner

MECHANISM FOR IMPLEMENTING CLASS REDIRECTION IN A CLUSTER

TECHNICAL FIELD

The present invention relates to data transfer interface technology in a data network, and more particularly, relates to a mechanism for implementing class redirection at any node and switch to handle request redirection for a given class in a cluster.

BACKGROUND

As high-speed and high-performance communications become necessary for many applications such as data warehousing, decision support, mail and messaging, and transaction processing applications, a clustering technology has been adopted to provide availability and scalability for these applications. A cluster is a group of one or more host systems (e.g., computers, servers and workstations), input/output (I/O) units which contain one or more I/O controllers (e.g. SCSI adapters, network adapters etc) and switches that are linked together by an interconnection fabric to operate as a single data network to deliver high performance, low latency, and high reliability. Clustering offers three primary benefits: scalability, availability, and manageability. Scalability is obtained by allowing servers and/or workstations to work together and to allow additional services to be added for increased processing as needed. The cluster combines the processing power of all servers within the cluster to run a single logical application (such as a database server). Availability is obtained by allowing servers to "back each other up" in the case of failure. Likewise, manageability is obtained by allowing the cluster to be utilized as a single, unified computer resource, that is, the user sees the entire cluster (rather than any individual server) as the provider of services and applications.

Emerging network technologies for linking servers, workstations and network-connected storage devices within a cluster include InfiniBand™ and its predecessor, Next Generation I/O (NGIO) which have been recently developed by Intel Corp. and other companies to provide a standard-based I/O platform that uses a channel oriented, switched fabric and separate I/O channels to meet the growing needs of I/O reliability, scalability and performance on commercial high-volume servers, as set forth in the "Next Generation Input/Output (NGIO) Specification," NGIO Forum on Jul. 20, 1999 and the "InfiniBand™ Architecture Specification," Revision 1, the InfiniBand™ Trade Association on Jun. 19, 2001.

One major challenge to implementing clusters based on NGIO/InfiniBand™ technology is to ensure that data messages traverse reliably between given ports of end nodes, via one or more given transmission links of a switched fabric data network. Work queues formed in pairs for a certain class of operation, known as a queue pair (QP), are typically utilized at an interface mechanism, known as channel adapter (CA), to process work requests (i.e., message send/receive operations and remote direct memory access "RDMA" read/write operations) posted from clients to describe data movement operation and location of data to be moved for processing and/or transportation via a switched fabric data network. Any time an incoming data message arrives at a queue pair (QP) from the wire, a receive buffer must be posted for that data message. Before data message can be exchanged between end nodes, all nodes in the switched fabric data network need to be configured, and the interface to a given class service agent may be relocated or redirected to an appropriate queue pair (QP) to processing the data message.

However, the current method of redirection on general services queue pair (QP) for management as defined by the InfiniBand™ Architecture Specification set forth on Jun. 19, 2001 requires a redirection stub to be resident on a subnet management "SM" node in the switched fabric data network which, in turn, requires complex hardware platform and operating system for implementation. In addition, all class managers/agents must be implemented on the SM node which can suffer a lot of wasted bandwidth and high message processing times due to congestion and message drops and retries.

Accordingly, there is a need for a more efficient mechanism to implement redirection on general services queue pair (QP) for InfiniBand™ management to process data message without providing a redirection stub on the SM node in a switched fabric data network so as to reduce fabric bandwidth required for management traffic and fabric congestion.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and Server Net and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
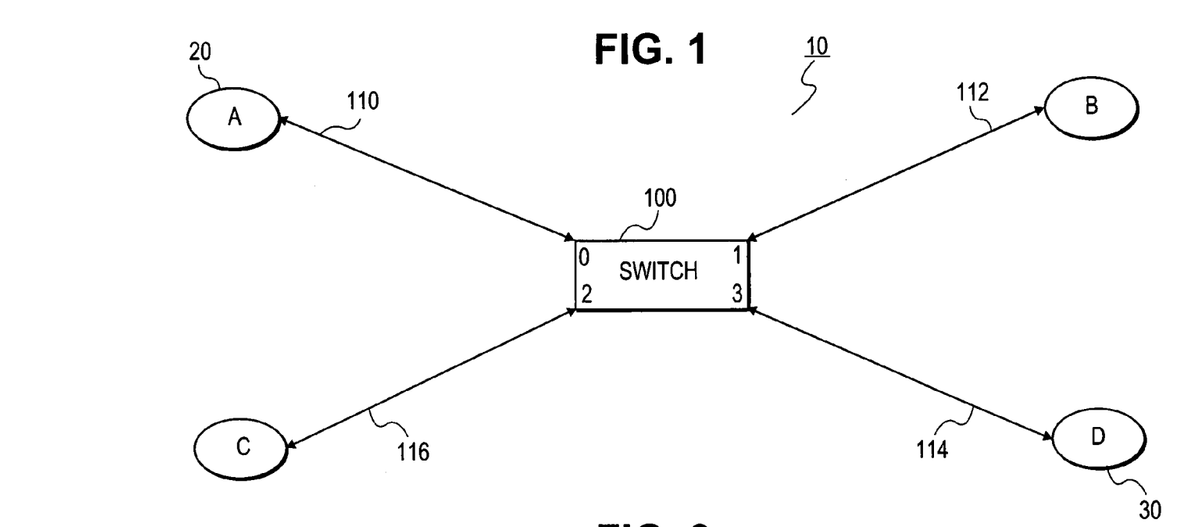
FIG. 1 illustrates a simple data network having several interconnected nodes for data communications according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 116, and 114. Each physical link may support a number of logical point-to-point channels. Each channel may be a bi-directional data path for allowing commands and data messages to flow between two connected nodes (e.g., host systems, switch/switch elements, and I/O units) within the data network.

Each channel may refer to a single point-to-point connection where data may be transferred between end nodes (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end nodes (e.g., host systems and I/O units), switches and links shown in FIG. 1 is provided simply as an example data network. A wide variety of implementations and arrangements of a number of end nodes (e.g., host systems and I/O units), switches and links in all types of data networks may be possible.

According to an example embodiment or implementation, the end nodes (e.g., host systems and I/O units) of the example data network shown in FIG. 1 may be compatible with the "Next Generation Input/Output (NGIO) Specification" as set forth by the NGIO Forum on Jul. 20, 1999, and the "InfiniBand™ Architecture Specification" as set forth by the InfiniBand™ Trade Association as revised on Jun. 19, 2001. According to the NGIO/InfiniBand™ Specification, the switch 100 may be an NGIO/InfiniBand™ switched fabric (e.g., collection of links, routers, switches and/or switch elements connecting a number of host systems and I/O units), and the end node may be a host system including one or more host channel adapters (HCAs), or a remote system such as an I/O unit including one or more target channel adapters (TCAs). Both the host channel adapter (HCA) and the target channel adapter (TCA) may be broadly considered as fabric (channel) adapters provided to interface end nodes to the NGIO/InfiniBand™ switched fabric, and may be implemented in compliance with "Next Generation I/O Link Architecture Specification: HCA Specification, Revision 1.0", and the "InfiniBand™ Specification" and the "InfiniBand™ Link Specification" for enabling the end nodes (endpoints) to communicate to each other over an NGIO/InfiniBand™ channel(s) with data transfer rates, for example, from 2.5 gigabit per second (Gbps), 10 Gbps and 30 Gbps.

Figure 2:
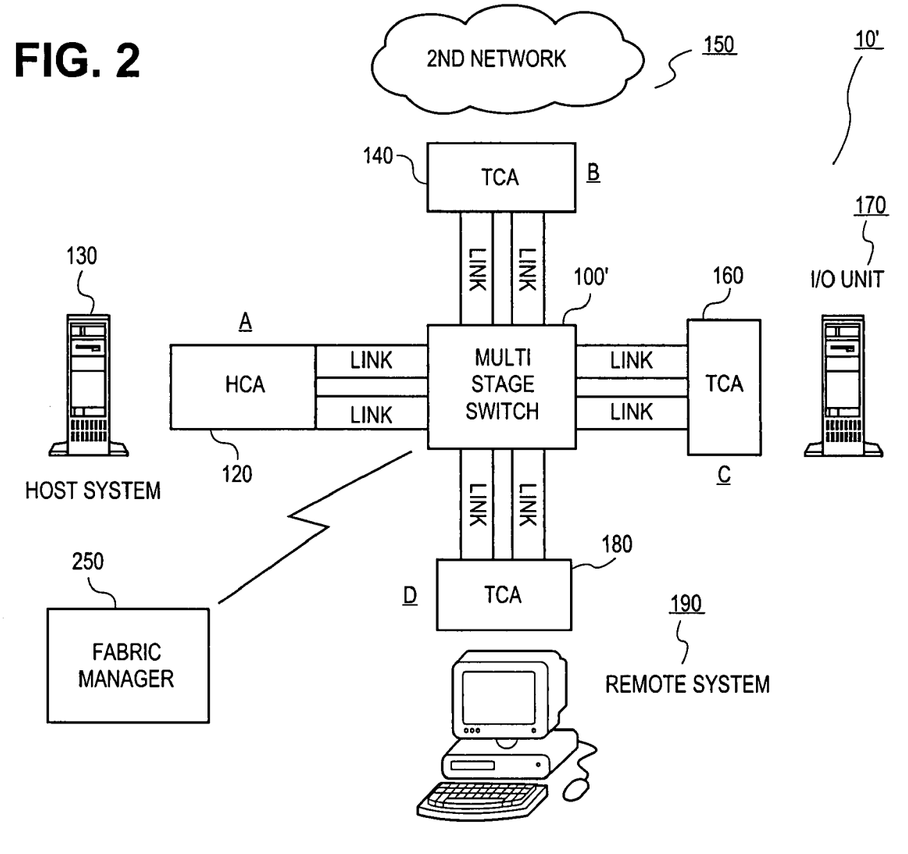
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ Architecture to transfer message data from a source node to a destination node according to an embodiment of the present invention. As shown in FIG. 2, the data network 10' includes an NGIO/InfiniBand™ switched fabric 100' for allowing a source node and a destination node to communicate to a large number of other nodes over one or more designated channels. Each node may contain work queue formed in pairs, known as Queue Pair (QP), in which service (work) requests are posted by a consumer (independent process or thread of an operating system "OS") to describe data transfer operations (i.e., send/receive operations and remote direct memory access "RDMA" read/write operations) and location of data to be moved for processing and/or transportation over one or more designated channels via a switched fabric 100'. Each end node may also serve as a source (initiator) node which initiates a message data transfer (message send operation) or a target node of a message passing operation (message receive operation). Examples of such a system include host servers providing a variety of applications or services and I/O units providing storage oriented and network oriented IO services. Work requests (data movement operations such as message send/receive operations and RDMA read/write operations) may be posted to queue pairs (QPs) such that one or more channels between communication devices at an end node (host system) or between multiple end nodes connected together directly or via a data network may be created and managed to perform requested operations. A channel connection may be established over a switched fabric 100' to allow work queue pairs (QPs) at source and destination nodes (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end nodes or end stations, switches and links may be used for relaying data in groups of packets between the end stations and switches via corresponding NGIO/InfiniBand™ links. A link can be a copper cable, an optical cable, or printed circuit wiring on a backplane used to interconnect switches, routers, repeaters and channel adapters (CAs) forming the NGIO/InfiniBand™ switched fabric 100'.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as channel adapters (CAs) (also known as fabric adapters) provided to interface either the host system 130 or any one of the remote systems 150, 170 and 190 to the switched fabric 100', and may be implemented in compliance with "Next Generation I/O Link Architecture Specification: HCA Specification, Revision 1.0" and the "InfiniBand™ Architecture Specification" for enabling the end nodes (endpoints) to communicate on one or more an NGIO/InfiniBand™ link(s). Individual channel adapters (CAs) and switches may have one or more connection points known as ports for establishing one or more connection links between end nodes (e.g., host systems and I/O units). In addition, one or more channel adapters (CA) may be advantageously installed, for example, at a host system 130 to expand the number of ports available for redundancy and multiple switched fabrics.

The multi-stage switched fabric 100' may include one or more subnets interconnected by routers in which each subnet is composed of switches, routers and end nodes (such as host systems or I/O subsystems). In addition, the multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions.

If the multi-stage switched fabric 100' represents a single subnet of switches, routers and end nodes (such as host systems or I/O subsystems) as shown in FIG. 2, then the fabric manager 250 may alternatively be known as a subnet manager "SM". The fabric manager 250 may reside on a port of a switch, a router, or a channel adapter (CA) of an end node and can be implemented either in hardware or software. When there are multiple subnet managers "SMs" on a subnet, one subnet manager "SM" may serve as a master SM. The remaining subnet managers "SMs" may serve as standby SMs. The master SM may be responsible for (1) learning or discovering fabric (network) topology; (2) assigning unique addresses known as Local Identifiers (LID) to all ports that are connected to the subnet; (3) establishing all possible data paths among end nodes, via switch forwarding tables (forwarding database); and (4) detecting and managing faults or link failures in the network and performing other network management functions. However, NGIO/InfiniBand™ is merely one example embodiment or implementation of the present invention, and the invention is not limited thereto. Rather, the present invention may be applicable to a wide variety of any number of data networks, hosts and I/O units using industry specifications. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
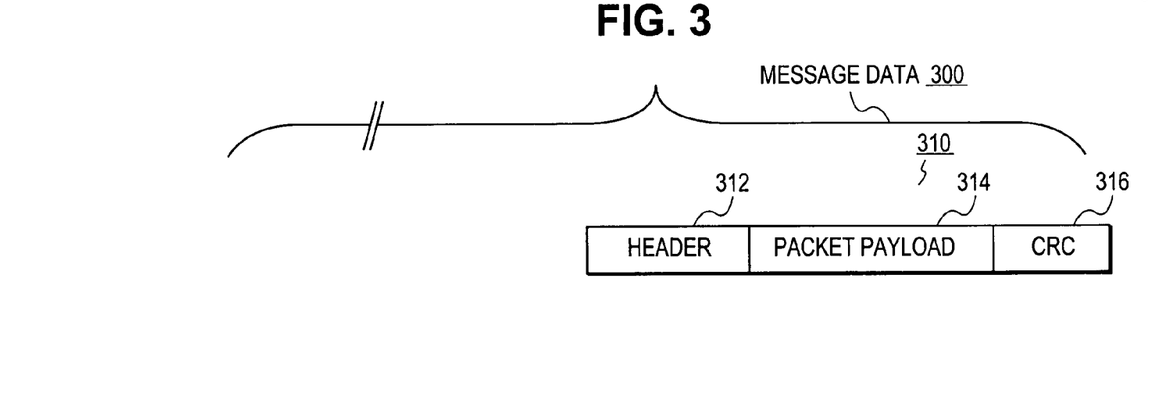
FIG. 3 illustrates an example packet of data messages transmitted from a source node (data transmitter) to a destination node (data receiver) in an example data network according to an embodiment of the present invention.

FIG. 3 illustrates an example packet format of message data transmitted from a source node (data transmitter) to a destination node (data receiver) through switches and/or intermediate nodes in an example IBA subnet according to the "InfiniBand™ Architecture Specification" Revision 1 as set forth by the InfiniBand Trade Association on Jun. 19, 2001. As shown in FIG. 3, a message data 300 may represent a sequence of one or more data packets 310 (typically derived from data transfer size defined by a work request). Each packet 310 may include header information 312, variable format packet payload 314 and cyclic redundancy check (CRC) information 316. Under the "Next Generation Input/Output (NGIO) Specification" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, for example, a local routing header, a global routing header, a base transport header and extended transport headers each of which contains functions as specified pursuant to the "InfiniBand™ Architecture Specification". For example, the local routing header may contain fields such as a destination local identifier (LID) field used to identify the destination port and data path in the data network 10', and a source local identifier (LID) field used to identify the source port (injection point) used for local routing by switches within the example data network 10' shown in FIG. 2.

Figure 4:
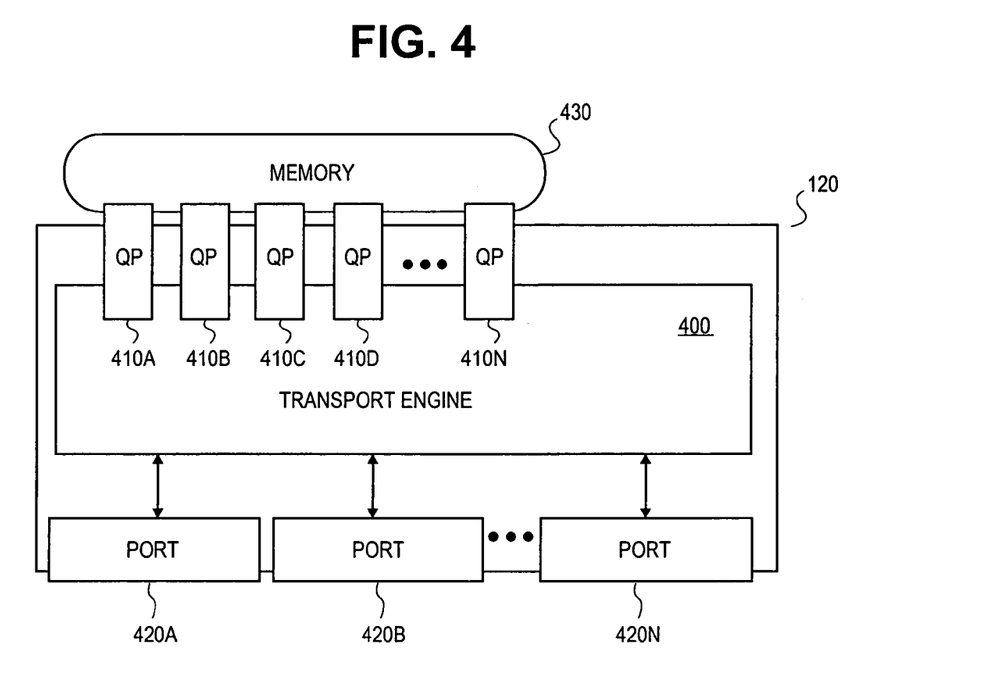
FIG. 4 illustrates an example channel adapter (CA) installed in a host system to support data transfers via a switched fabric according to an embodiment of the present invention.

FIG. 4 illustrates an example channel adapter (CA) installed, for example, in a host system to support data transfers via an InfiniBand™ switched fabric according to an embodiment of the present invention. As shown in FIG. 4, the host channel adapter (HCA) 120 may include a programmable transport engine 400 supporting a number of queue pairs (QPs) 410A–410N in which work requests may be posted to describe data movement operation and location of data to be moved for processing and/or transportation via a switched fabric 100'. Such a transport engine 400 may be hardware which resides in a host memory 430 separately from the host channel adapter (HCA) 120, or alternatively, may be software provided as part of kernel-level device drivers (not shown) of a host operating system (OS).

All queue pairs (QPs) may share physical ports 420A–420N into a switched fabric 100' as shown in FIG. 4. Each queue pair (QP) includes a send queue ("SQ" for outbound requests) served as an "initiator" which requests, for example, normal message sends, remote direct memory access "RDMA" reads which request messages to be read from specific memory locations of a target system, via a switched fabric 100' as shown in FIG. 4, and remote direct memory access "RDMA" writes which request messages to be written onto specific memory locations of a target system, via a switched fabric 100' as shown in FIG. 4; and a receive queue ("RQ" for inbound requests) served as a "responder" which receives requests for messages from normal sends, RDMA reads and RDMA writes from a target system, via a switched fabric 100' as shown in FIG. 4. For each port, there may be two special QPs (QP0 and QP1) configured for management and all other QPs configured for operation through a particular port.

The host channel adapter (HCA) 120 may also have multiple ports 420A–420N to access the switched fabric 100' as shown in FIG. 4. Each port may be assigned a local ID (LID) or a range of LIDs. Each port has its own set of transmit and receive buffers (FIFOs) utilized to send and receive data messages, via the switched fabric 100' as shown in FIG. 4.

Figure 5:
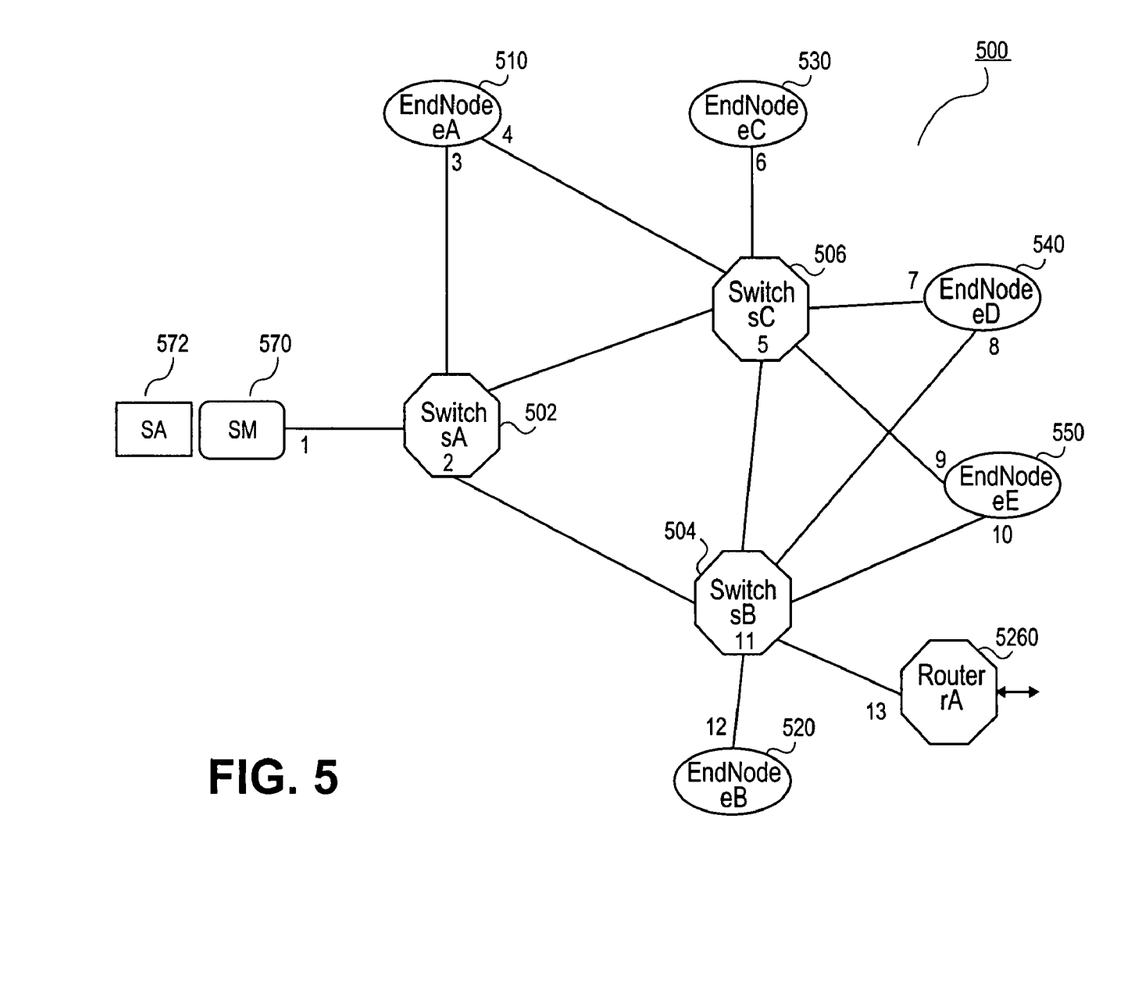
FIG. 5 illustrates an example InfiniBand™ Architecture (IBA) subnet including switches, routers and channel adapters (CAs) installed at respective end nodes according to an embodiment of the present invention.

Turning now to FIG. 5, an example InfiniBand™ Architecture (IBA) subnet in an InfiniBand™ cluster including, but not limited thereto, five (5) end nodes (eA) 510, (eB) 520, (eC) 530, (eD) 540, and (eE) 550 including one or more channel adapters (not shown), a router (rA) 560 and a subnet manager (SM) 570 according to an embodiment of the present invention is illustrated. Router (rA) 560 may be used as an interconnect to one or more IBA subnets to form a switched fabric 100 as shown in FIG. 4. Each end node (eA) 510, (eB) 520, (eC) 530, (eD) 540, and (eE) 550 may serve as an individual service provider or an individual InfiniBand™ client requesting services from the service provider in a client/server model, for example. One or more channel adapters (CAs) may be installed at each end node (eA) 510, (eB) 520, (eC) 530, (eD) 540, and (eE) 550.

The IBA subnet 500 may also include a collection of switch (sA) 502, switch (sB) 504, and switch (sC) 506 arranged to establish connection between the end nodes 510, 520, 530 and 540, via respective channel adapters (CAs). Each switch as well as the channel adapter (CA) may have one or more connection points called "ports" provided to establish connection with every other switch and channel adapter (CA) in an example IBA subnet 500 via one or more links.

Typically IBA management services may be provided by the local subnet manager "SM" 570 and subnet administrator "SA" 572. The subnet manager "SM" 570 and the subnet administrator "SA" 572 may substitute the fabric manager 250 shown in FIG. 2, and can be implemented either in hardware or software module (i.e., an application program) installed to provide IBA management services for all switches and end nodes in the IBA subnet 500. For example, if the subnet manager "SM" 570 is implemented in software, a subnet management access module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human subnet (fabric) administrator to conveniently plug-in or download into an existing operating system (OS). Alternatively, the software access module may also be bundled with the existing operating system (OS) which may be activated by a particular device driver for performing all subnet management functions in compliance with the InfiniBand™ Architecture specification.

In one embodiment of the present invention, the subnet manager "SM" 570 and the subnet administrator "SA" 572 may be installed at any one or more of the end nodes (eA) 510, (eB) 520, (eC) 530, (eD) 540, and (eE) 550 or the switches (sA) 502, (sB) 504, and (sC) 506 for managing all subnet management functions. However, the subnet manager "SM" 570 and the subnet administrator "SA" 572 may also be installed as part of any individual end node and switch within the IBA subnet 500 as shown in FIG. 5.

The IBA management services may be broadly classified into subnet services and general services. At a minimum the subnet services, offered by the subnet manager "SM" 570, include basic initialization such as discovering fabric topology, assigning unique addresses called Local Identifiers (LID) to all ports that are connected to the IBA subnet 500, programming switch forwarding tables (also known as routing table) and maintaining general functioning of the IBA subnet 500 as shown in FIG. 5. Most of the data collected during discovery and used to configure the IBA subnet 500 may then be assimilated by the subnet administrator "SA" 572 to provide access to information such as data paths and alternate data paths between end nodes, topology change notifications and notification of events, including error detection, and recovery procedures.

General Services provide the following management classes, including for example, a Communication Management service which provides the mechanism to set up and manage communications between a pair of queue pairs (QP) or, in certain cases, to identify which queue pair (QP) to use for a certain service; a Performance Management service which specifies a set of facilities for examining various performance characteristics of the IBA subnet 500 as shown in FIG. 5; a Device Management service which specifies the means for determining the type and location of various types of fabric-attached devices such as I/O controllers; a Device Configuration service which assigns fabric-attached devices such as I/O controllers to hosts; a Baseboard Management service which provides a means to transport messages to fabric-attached devices beyond the subnet; and a Network Protocol service which specifies mechanisms to support transport of protocol operations such as Simple Network Management Protocol "SNMP" operations through the IBA subnet 500 as shown in FIG. 5.

In addition, particular cluster implementations may also need and contain proprietary services to perform cluster-specific functions. For example, specific cluster implementations may contain a Name Service that maps host system names to InfiniBand™ information such as Local Identifiers (LIDs), Global Identifiers (GIDs), Globally Unique Identifiers (GUIDs) etc.

Each of these IBA management services may be implemented as logically independent entities, referred to as Managers and Agents, and Interfaces. Managers may be conceptual functional entities that effect control over IBA fabric-attached devices (or elements) or provide for gathering information from IBA fabric-attached devices. In general, Managers may reside anywhere in the IBA subnet 500 (or switched fabric 100' as shown in FIG. 4). Similarly, Agents may be conceptual functional entities present in IBA channel adapters (CAs), switches, and routers that process management messages arriving at the port of the IBA channel adapters (CAs), switches, and routers where they exist. Both Managers and Agents may reside on different ports on different channel adapters (CAs) installed at end nodes in an IBA subnet 500 as shown in FIG. 5 or be located on the same port and same channel adapter (CA).

Figure 6:
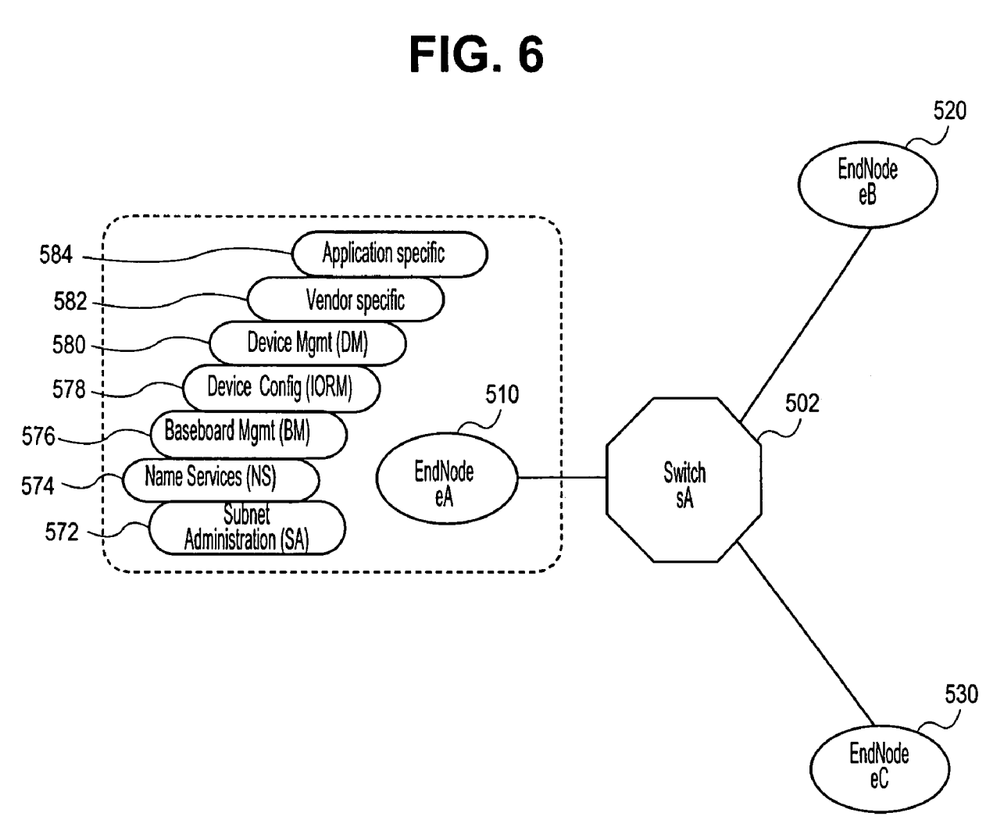
FIG. 6 illustrates an example overview of Class Managers in an example IBA subnet according to an embodiment of the present invention.

For example, FIG. 6 provides an overview of multiple Class Managers that reside at an end node in an IBA subnet 500. As shown in FIG. 6, example Class Managers may include a Subnet Administrator (SA) 572, Name Services (NS) Manager 574, Baseboard Manager 576, 10 Resource Manager (IORM) 578, Device Manager 580, Vendor Specific Manager 582 and Application Specific Manager 584 installed at the same port of end node (eA) 510.

Interfaces may represent a target (for example, queue pairs "QPs") to which data messages may be sent and through which data messages will be processed or will be dispatched to an appropriate processing entity. Management operations may be divided into a set of management service classes. For a given class of activity, there is usually only a small number of managers on an IBA subnet 500 as shown in FIG. 5. Conceptually, of each supported service class, there may be one agent on each channel adapter (CA), switch, and router on the IBA subnet 500 as shown in FIG. 5.

Communication between Managers and Agents, and in some cases, between Agents, may be performed through management messages referred to as Management Datagrams (MADs). Management Datagrams (MADs) are the basic elements of the message scheme defined for management communications. MADs may be classified into predefined management classes and for each MAD there may be a specified format, use, and behavior according to the infiniBand™ Architecture specification.

In addition, the IBA management services including the subnet services and the general services may also be assigned by Management Datagram classes (MAD classes). For example, the subnet administration service may be assigned MAD class 3, the device management service may be assigned MAD class 6, SNMP service may be assigned MAD class 8 etc. For each service, there are typically service managers, called Class Managers for the MAD class and service agents, called Class Agents for the MAD class. Class Managers and Class Agents communicate with each other using messages of the MAD class assigned to that service.

According to the InfiniBand™ Architecture specification, the subnet services use a special class of Management Datagram (MAD) called a Subnet Management Packet (SMP) which is directed to a special queue pair (QP0). Likewise, General Services use another class of Management Datagram (MAD) called a General Management Packet (GMP) which is directed to a special queue pair (QP1) called the General Service Interface (GSI). After all end nodes and switch forwarding tables have been assigned LIDs by the subnet manager "SM" 570, data can be sent to end points on different nodes on the IBA subnet 500 as shown in FIG. 5. General Services Management Packets (GMPs) are sent on QP1 of any given port for the different management classes branched under the General Services of the InfiniBand™ Architecture specification. These GMPs are sent by Class Agents/Managers across different nodes of the IBA subnet 500 as shown in FIG. 4 to manage the switched fabric 100' as shown in FIG. 4. Examples of the Class Agents/Managers include the Subnet Administrator (SA) 572, Name Services Manager 574, Baseboard Manager 576, 10 Resource Manager (IORM) 578, Device Manager 580, Vendor Specific Manager 582 and Application Specific Manager 584 as shown, for example, in FIG. 6. These Class Agent/Managers may send and receive a large amount of data on QP1 depending on the topology of the IBA subnet 500 as shown in FIG. 5.

SMPs can be sent and received based on subnet manager (SM) queries or be forwarded as traps and notices. Likewise, GMPs may be sent and received by the various Class Managers or be forwarded as traps and notices by mechanisms currently defined in the InfiniBand™ Architecture specification.

QP0 and QP1 are unreliable datagram (UD) queue pairs used for subnet management purposes and hence, are commonly referred to as "management QPs". QP0 may be managed by the agent of subnet services, known as Subnet Management Agent (SMA) that resides on a channel adapter (CA), switch, or router on the IBA subnet 500. The Subnet Management Agent (SMA) provides the means for the subnet manager "SM" 570 to manage the IBA subnet 500 as shown in FIG. 5. For example, the SMA uses the channel adapter (CA) control software that interacts with the channel adapter (CA) hardware and provides uniform access to all types of adapter hardware to clients. QP0 may also be used exclusively for sending and receiving subnet management MADs (SMP) through the interface from the wire to subnet management agents, known as the Subnet Management Interface (SMI).

Similarly, QP1 may be managed by the agent of general services, known as General Services Agent (GSA) on the channel adapter (CA), switch, or router on the IBA subnet 500 as shown in FIG. 5. QP1 may also be reserved exclusively for subnet administration and general services MADs through the interface from the wire to class service agents, known as General Services Interface (GSI). The SMA and GSA are required to exist on each active port of the channel adapter (CA). The SMA and GSA may have multiple InfiniBand™ clients that sit on top and use the services of the SMA and GSA to receive incoming messages and send outgoing messages. All SMP messages sent/received on behalf of the SMA and all its clients are done through a single QP—the SMI QP0. All GMP messages sent/received on behalf of the GSA and all its clients are done through a single QP—the GSI QP1. At any time, these queue pairs (QP0 and QP1) can receive more than one MAD.

Before a data message can be exchanged between different end nodes on the IBA subnet 500, the IBA subnet 500 must be initialized and configured by the subnet manager "SM" 570 and the subnet administrator "SA" 572 installed at an example end node, such as end node "eA" 510 as shown in FIG. 5, (also known as a "SM" node) for physical subnet establishment, subnet discovery, LID assignments, path determination, switch configuration, subnet activation, path resolution etc. Once the IBA subnet 500 is configured and all ports are transitioned to active, General Services Agents (GSAs) on all nodes will query the Subnet Administrator (SA) 572 on the Subnet Manager (SM) node for respective properties and path records to other fabric-attached agents. In other words, the management agents that use services based on the General Services will try to connect to Class Managers for class specific input. The class manager query will always be targeted to the SM node, i.e., end node "eA" 510 as shown in FIG. 5, for example, since only the LID of the SM node is well known at this point in time. If the Class Manager is resident on the SM node, i.e., end node "eA" 510 as shown in FIG. 5, the end node that initiated the query should get a reply under normal circumstances. However, if the Class Manager does not reside on the SM node, i.e., end node "eA" 510 as shown in FIG. 5, the end node that initiated the query should provide a means to redirect the query to the appropriate LID and QP of the true Class Manager by way of class management attributes, for example, ClassPortInfo attribute according to the definition specified by the InfiniBand™ Architecture specification.

As per the InfiniBand™ Architecture specification, class management attributes are composite structure consisting of components typically representing hardware registers in channel adapters (CAs), switches, or routers. One example of such attributes is a ClassPortInfo attribute used to indicate if redirection is supported, and, if so, contains redirection information for MADs of the subject class, that is, all of the information necessary to access the redirected service either from within the same IBA subnet 500 or from a different subnet in the switched fabric 100'. The first and subsequent queries to a redirected Class Manager on a SM node should always return the ClassPortInfo(GetResponse) with the status field in the common MAD header set to Redirection Required. This response which contains the ClassPortInfo of the queried Class Manager will provide the redirected information to the end node that issued the query. The end node can then issue all subsequent queries to the class information as per the ClassportInfo(GetResponse).

However, the InfiniBand™ Architecture specification does not provide a mechanism of redirection for Class Managers that do not wish to reside on the SM node, i.e., end node "eA" 510 as shown in FIG. 5. Under the existing mechanism of redirection for Class Managers according to the InfiniBand T Architecture specification, the Class Manager must be implemented on the SM node, i.e., end node "eA?" 510 as shown in FIG. 5. If the Class Manager needs redirection to a different node, a redirection stub must be present on the SM node. If the software stack on the SM node is implemented by a vendor other than the one that implemented the redirected Class Manager, the software interface on the SM node needs to be exposed to the vendor that implements the Class Manager for the Class redirector stub. The implementation of the Class Redirection stub requires complex hardware platform and operating system resources.

In additions if the work load is high on the General Services QP1 on the SM node, there may be a likely probability of datagrams being dropped. In a large IBA subnet, multiple queries to the SM node on different classes may overload the port and increase congestion and reduce throughput. Moreover, implementing all Class Managers/Agents on the SM node may not be optimal in a large IBA subnet, and likewise, the implementation of standby Class Managers may not be possible if all queries have to go to the SM node.

For example, if end node (eE) 550 as shown in FIG. 5 at LID #10 sent a query to a Class Manager that resided on end node (eB) 520 at LID #12, the query would first go to end node (eA) 510 through switch (sB) 504 and switch (sA) 502. The Class redirection stub would send a redirection required reply back to end node (eE) 550 with the ClassPortInfo attributes. The redirection required reply would travel via switch (sA) 502 and switch (sB) 504 and back to LID #10 on end node (eE) 550. The Class redirection stub must synchronize with its Class Manager/Agent at all times which may generate additional traffic in the IBA subnet 500.

In order to implement redirection without providing a Class Redirection stub on the SM node and to enhance the functionality of end nodes in system resources and complexity of software implementation, a Class Redirection Manager may be implemented on the SM node, such as end node (eA) 510 of an IBA subnet 500 to handle redirection of the InfiniBand™ management QPs to the Class Managers/Agents of these QPs regarding client requirements for receive buffers to handle bursty traffic and leads to far fewer dropped messages. Such a Class Redirection mechanism may be an algorithm executed by the host SM node when an incoming data message is received from the switched fabric. The algorithm may be software written by high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human fabric administrator to conveniently plug-in or download into an existing operating system (OS) of the host node. Alternatively, the software module may also be bundled with the existing operating system (OS) which may be activated when an incoming data message is received from a client in compliance with the InfiniBand™ Architecture specification. As a result, a Class Manager can be implemented on any end node, and a Class Redirection stub need not be implemented on the SM mode. In addition, if the Class Managers do not reside on the SM node, the system throughput can be drastically increased with fewer dropped messages and fewer messages to the SM node. Therefore, the fabric bandwidth required for management traffic and fabric congestion can be reduced significantly. Likewise, the functionality of end nodes in system resources can be enhanced and the complexity of software implementation can be simplified.

According to an embodiment of the present invention, a Class Redirection Manager will work in the following ways:

1. The Class Redirection Manager will always be implemented on the SM node. The Class Redirection Manager will contain a management class that does not overlap with any management classes currently defined by the InfiniBand™ Architecture specification, and implement General Services on the management queue-pair QP1.

2. All Class Managers will first register with the Class Redirection Manager that resides on the SM node. The registration will be done using General Services Management Packets (GMPs). The registration will contain information of the LID of an end node on which each Class Manager resides thereon. An addition to this implementation can be using the whole ClassPortInfo of that management class as part of the registration message. The ClassPortInfo contains all the redirection information necessary for the redirected class.

3. When a client sends a query a Class Manager for its ClassPortInfo, the query first goes to the SM node. Depending on how Class Managers/Agents are implemented on the SM node, the data message can be processed in the following ways:

(a) The GSA forwards the data message to the owner of the message Class registered with the GSA on that node (SM node). This is same as in current implementations where the GSA de-multiplexes messages to the appropriate Class Manager. If the Class Manager/Agent is not registered, the GSA forwards the data message to the Class Redirection Manager implemented on the SM node. The Class Redirection Manager will then forward or reply to the data messages if the Class that the message came on is registered thereon (Class Redirection Manager).

(b) The GSA forwards all ClassPortInfo(get) messages to the Class Redirection Manager. The Class Redirection Manager will forward the data message to the appropriate class agent if it is registered.

(c) If the Class Redirection Manager holds the ClassPortInfo of the registered class, the Class Redirection Manager will post a reply to the ClassPortInfo(get) instead of forwarding the data message to the Class Agent.

4. If the class is not registered, the Class Redirection Manager will drop the data message. Additionally, the Class Redirection Manager can provide a MAD status of CLASS_NOT_SUPPORTED.

5. Optionally, redirection information functionality may be downloaded to all switches in the IBA subnet. This is possible if the switch supports a special attribute called Class redirection tables. The Class redirection tables if implemented should support a get and set operation on the Class redirection tables. The table will be a linear table that holds the redirection LID to a specific class. With Class redirection implementation on switches, the Class redirection tables can support multiple Class Managers for a given class on the same IBA subnet implementing load balancing. The switch redirection will work in the following ways:

(a) A client on any node will issue a class query not to the SM node but the node with a destination LID of, for example, 0xFFFF as referring to the SMA.

(b) The switch will trap all messages that come on QP1 with a destination of xFFFF. The switch will pull out the management class information from the MAD and do a lookup in its Class redirection tables. If the switch finds a match in the Class redirection tables, the switch will first change the destination LID in the LRH (transport headers) of the message just received to the LID of the Class Manager as specified in the Switch redirection tables.

(c) The switch will then output the MAD to the destination LID as if the MAD arrived at the source port.

(d) If the switch does not find a match to the Class in its Class redirection tables, the switch will silently drop the data message.

6. The Class Redirection Manager can optionally implement a persistent store of the class registrations through system reboots. This may help in quick access of the Class Manager even before it is registered.

An example Class Redirection table may be shown as TABLE #1 as follows:

| Component | Access | Bit Length | Description |
|---|---|---|---|
| Class forwarding table | RW | 512 | List of 32 LID block elements |

An example LID block element may be shown as TABLE #2 as follows:

| Component | Bit Length | Description |
|---|---|---|
| LID | 16 | LID to which data packets with the management Class corresponding to this entry are to be forwarded |

Figure 7:
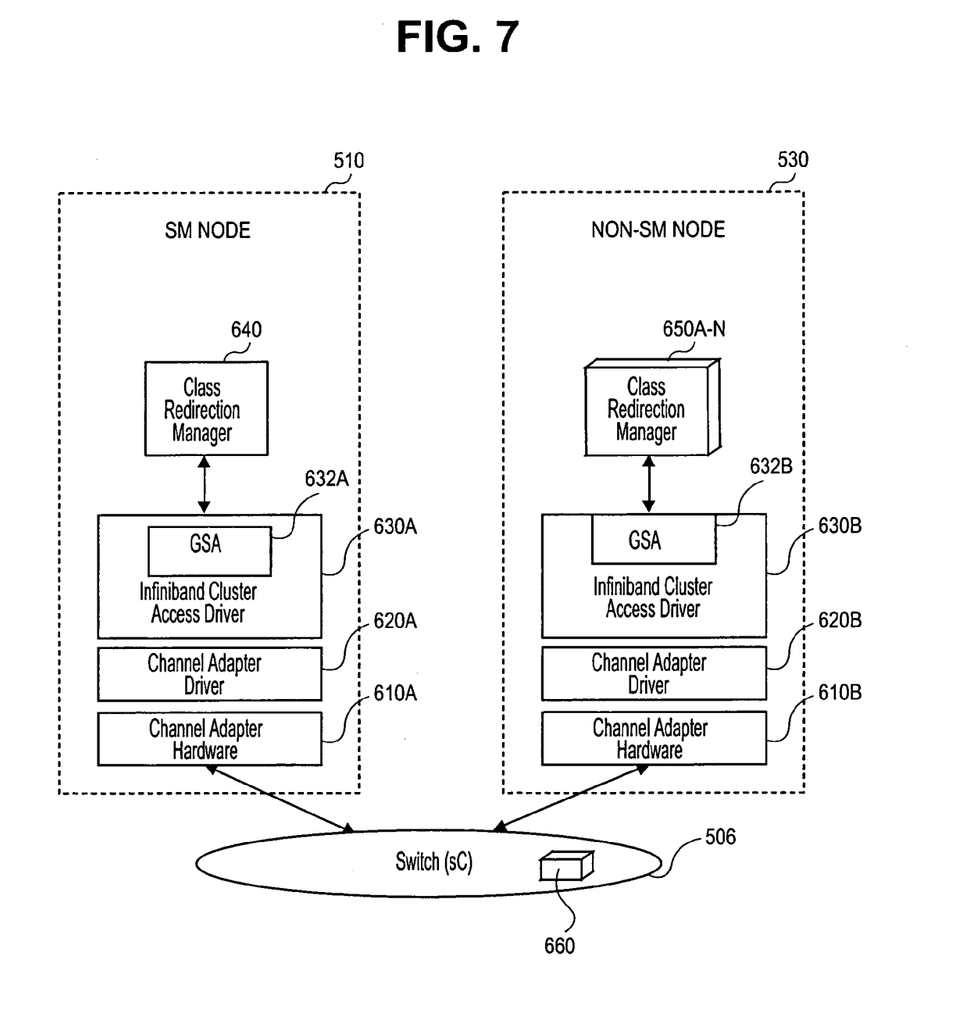
FIG. 7 illustrates an example subnet management (SM) node and an example non-SM node in an example IBA subnet according to an embodiment of the present invention.

Turning now to FIG. 7, an example subnet management (SM) node such as end node (eA) 510 and an example non-SM node such as end node (eC) 530 in an example IBA subnet 500 according to an embodiment of the present invention are illustrated. As shown in FIG. 7, for example, the SM node 510 may include, but not limited to, a channel adapter (CA) hardware 610A, a CA driver 620A, an InfiniBand™ cluster access driver 630A including a General Services Agent (GSA) 632A, and a Class Redirection Manager 640 implemented to handle redirection for those Class Managers that do not reside on the SM node 510, such as, for example, Subnet Administrator (SA), Name Services Manager, Baseboard Manager, 10 Resource Manager (IORM), Device Manager, Vendor Specific Manager and Application Specific Manager.

Non-SM node such as end node (eC) 530 may also include a channel adapter (CA) hardware 610B, a CA driver 620B, an InfiniBand™ cluster access driver 630B including a General Services Agent (GSA) 632B, and one or more Class Managers (Agents) 650A–650N that reside thereon. All Class Managers 650A–650N may first register with the Class Redirection Manager 640 using General Services Management Packets (GMPs) and the ClassPortInfo which contains all the redirection information necessary for redirection.

In both SM node 510 and non-SM node 520, the General Services Agent (GSA) 632A–632B residing therein may handle all incoming and outgoing data messages, via the switched fabric 500, for example, switch (sC) 506 as shown in FIG. 5. Such GSA may also refer to the group of all supported General Service Agents installed on a channel adapter (CA), switch, or router.

As described previously, the switch (sC) 506 as well as all other switches in the IBA subnet 500 may contain Class redirection tables 660 implemented to receive redirection information to handle redirection for Class Managers that do not wish to reside on the SM node 510.

Figure 8:
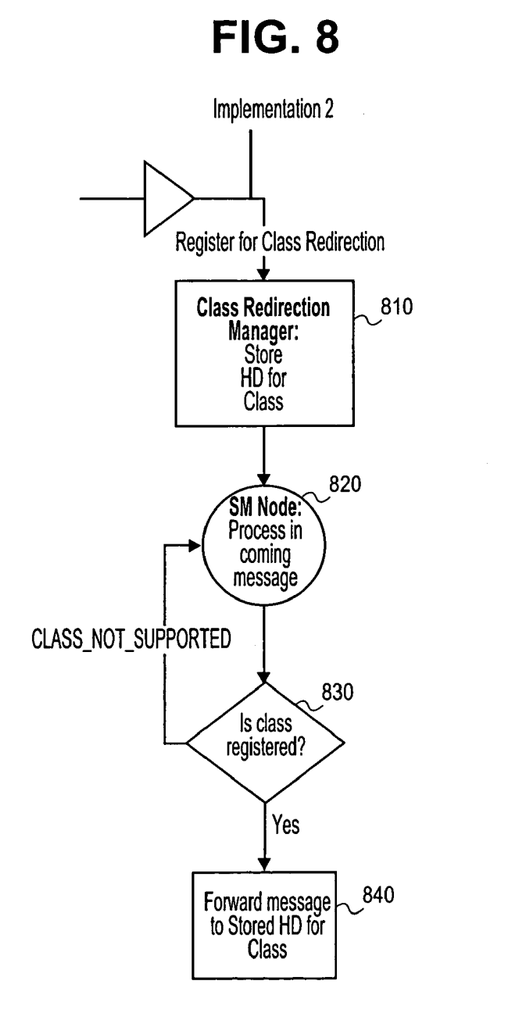
FIG. 8 illustrates an example implementation of a Class Redirection Manager on a subnet management (SM) node in an example IBA subnet according to an embodiment of the present invention.

FIG. 8 illustrates an example implementation of a Class Redirection Manager on a subnet management (SM) node in an example IBA subnet according to an embodiment of the present invention As shown in FIG. 8, the client must first register at the Class Redirection Manager 640 installed at a SM node such as end node (eA) 510, via the General Services Management packets (GMPs). The Class Redirection Manager 640 may then store the Local Identifier (LID)

for the class at block 810. When an incoming data message is received from the switched fabric, the SM node 510 processes the data message by determining the status of registration for the class of the incoming data message at block 820. If there is registration for that class, the Class Redirection Manager 640 forwards the data message to the Class Manager/Agent, via the stored LID for the class at block 840. However, if there is no registration for that class (i.e., the Class Redirection Manager 640 does not hold registration information for that class) at block 830, the Class Redirection Manager 640 may provide a reply with a MAD status of CLASS_NOT_SUPPORTED or drop the data message in order to process the next incoming data message. This procedure will be true for a ClassPortInfo (get) or any other request message to that class.

Figure 9:
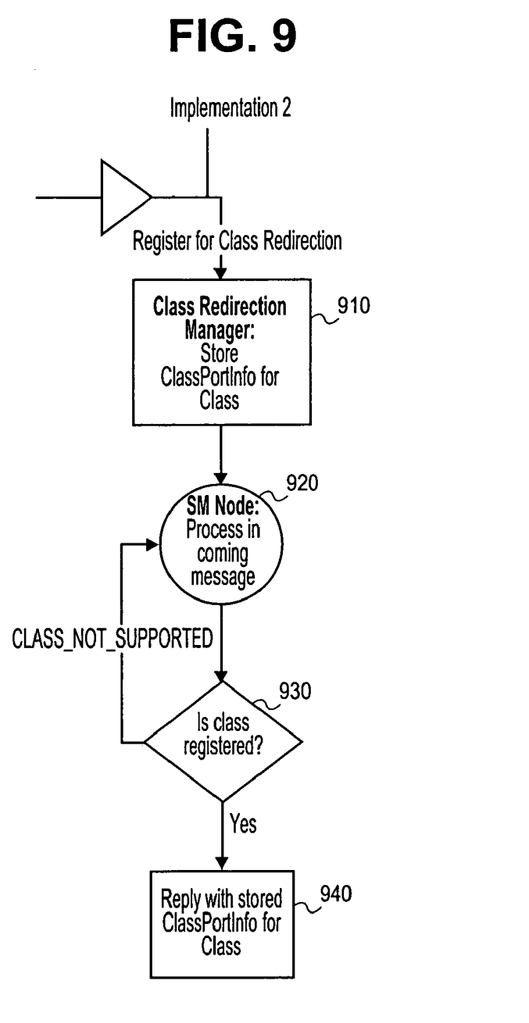
FIG. 9 illustrates an example implementation of a Class Redirection Manager on a subnet management (SM) node in an example IBA subnet according to another embodiment of the present invention.

FIG. 9 illustrates an example implementation of a Class Redirection Manager on a subnet management (SM) node in an example IBA subnet according to another embodiment of the present invention. As shown in FIG. 9, the client must first register at the Class Redirection Manager 64 installed at a SM node such as end node (eA) 510, via the General Services Management packets (GMPs). The Class Redirection Manager 640 may then store the ClassPortInfo for the class at block 910. When an incoming data message is received from the switched fabric, the SM node 510 processes the data message at block 920, and determines the status of the ClassPortInfo of the registered class at block 930. If the Class Redirection Manager 640 holds the ClassPortInfo of the registered class at block 830, the Class Redirection Manager 640 may post a reply with the stored ClassPortInfo for the class and a MAD status of REDIRECTION_REQUIRED at block 940. However, if the Class Redirection Manager 640 does not hold the ClassPortInfo of the registered class at block 930, then the Class Redirection Manager 640 may provide a MAD status of CLASS_NOT_SUPPORTED or drop the data message in order to process the next incoming data message.

Figure 10:
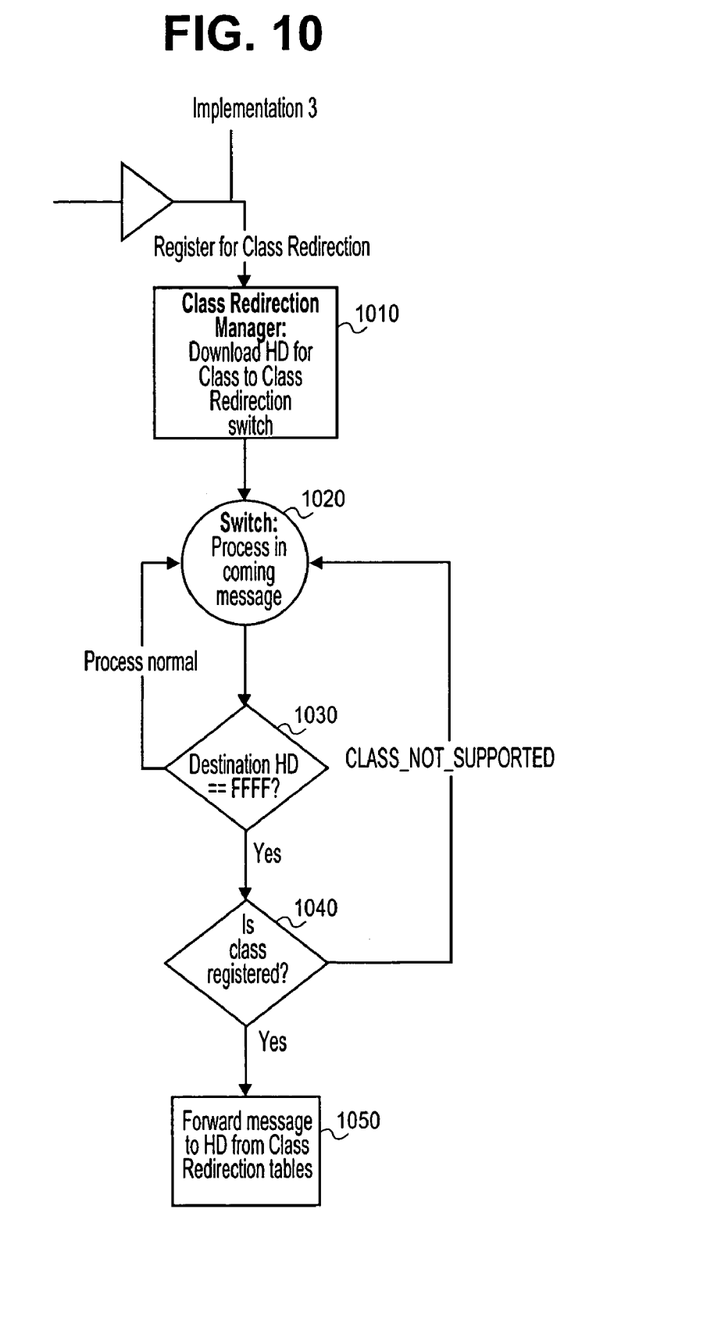
FIG. 10 illustrates an example implementation of a Class Redirection Manager on a subnet management (SM) node and an example switch in an example IBA subnet according to an embodiment of the present invention.

FIG. 10 illustrates an example implementation of a Class Redirection Manager 640 on a subnet management (SM) node and an example switch in an example IBA subnet according to an embodiment of the present invention. As shown in FIG. 10, the client must first register at the Class Redirection Manager 64 installed at a SM node such as end node (eA) 510, via the General Services Management packets (GMPs), for class redirection. The Class Redirection Manager 640 may then download LID for the class to the Class redirection tables in all the switches at block 1010. When an incoming data message is received from the switched fabric, the switch such as switch (sC) 506 as shown in FIG. 7, processes the data message at block 1020, and determines if the destination LID corresponds to xFFFF at block 1030. If the destination LID does not correspond to xFFFF, then the switch 506 processes the incoming data message normally. If the destination LID corresponds to xFFFF, the switch 506 proceeds to examine the MAD packet for its class and then determines if an entry exists for that class in its Class redirection tables at block 1040. If an entry is found in the Class redirection tables at block 1040, the switch may output the data message to the LID from the Class redirection tables at block 1050. However, if the switch does not hold an entry in its Class redirection tables at block 1040, the switch may provide a reply with a MAD status of CLASS_NOT_SUPPORTED or drop the data message in order to process the next incoming data message.

As described from the foregoing, the present invention advantageously provides a mechanism for Class Managers to implement redirection without providing a Class redirection stub on the subnet management "SM" node. As a result of the procedure as described with reference to FIGS. 7–10, Class Managers can be implemented on any end node in the IBA subnet, and a Class redirection stub need not be implemented on the SM node. With optional implementation of Class redirection tables on switches, the system throughput can be drastically increased with fewer dropped messages and fewer messages to the SM node if the Class Managers do not reside on the SM node. In addition, system resources and software implementation can be enhanced. As a result, InfiniBand clusters are more usable, client friendly and less wastefully congested. These properties assist in achieving the end result of a functional and high performance cluster and promote the use of clusters based on NGIO/InfiniBand™ technology.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the data network as shown in FIGS. 1–4 may be configured differently or employ some or different components than those illustrated. Such a data network may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. However, the mechanism shown in FIGS. 5–7 for Class Managers to implement redirection in those clusters may need to be adjusted accordingly. The algorithms shown in FIGS. 8–10 may be configured differently or employ some or different components than those illustrated without changing the basic function of the invention. In addition, storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A method for implementing class redirection on a host node in a switched fabric, comprising:
   storing a registration message including a Local Identifier (LID) of a Class Manager for a given class of general services from a remote node across the switched fabric, upon registration by the Class Manager;
   determining if redirection information for a registered class is included in the registration message, upon receipt of an incoming data message from the switched fabric; and
   redirecting the incoming data message to a stored Local Identifier (LID) of the Class Manager for the registered class at the remote node across the switched fabric, if redirection information for the registered class is included in the registration message.

2. The method as claimed in claim 1, wherein the host node serves as a subnet management (SM) node providing management services, including basic initialization such as discovering fabric topology, assigning Local Identifiers (LID) to all ports that are connected to the switched fabric, programming switch forwarding tables and maintaining general functioning of the switched fabric to provide access to information such as data paths and alternate data paths between end nodes, topology change notifications and notification of events, including error detection, and recovery procedures.

3. The method as claimed in claim 1, wherein the redirection information is part of a Management Datagram (MAD) including a ClassPortlnfo attribute used to indicate if redirection is supported at the host node and contain all information necessary to implement class redirection on the host node.

4. The method as claimed in claim 1, wherein the incoming data message is dropped if redirection information for the registered class is not included in the registration message, and the host node has no Class Manager resident thereon to process the incoming data message.

5. The method as claimed in claim 1, wherein the host node serves as a subnet management (SM) node including one or more Class Managers such as Subnet Administrator (SA), Name Services Manager, Baseboard Manager, IO Resource Manager (IORM), Device Manager, Vendor Specific Manager and Application Specific Manager for sending and receiving date messages on a special queue pair (QP1) known as General Service Interface (GSI) in accordance with the "IInfiniBand™ Architecture Specification".

6. The method as claimed in claim 1, wherein the host node is a switch which stores the registration message including the Local Identifier (LID) of the Class Manager for a given class of general services downloaded from the remote node across the switched fabric, in Class redirection tables, and redirects the incoming data message to the stored Local identifier (LID) of the Class Manager for the registered class at the remote node across the switched fabric from the Class redirection tables, if redirection information for the registered class is included in the registration message.

7. The method as claimed in claim 6, wherein the Class redirection tables are implemented to hold redirection LID of a given class and to support a get and set operation on the Class redirection tables.

8. A host node comprising:
at least one channel adapter (CA) including one or more ports to support data transfers, via a subnet; and
an access module including a General Services Agent (GSA) to enable one or more entities to send and receive data messages of management services on the host node, via the subnet, and a Class Redirection Manager to implement class redirection for Class Managers that do not reside on the host node;
wherein the Class Redirection Manager is configured to:
store a registration message including a Local Identifier (LID) of a Class Manager for a given class of general services from a remote node, via the subnet, upon registration by the Class Manager;
determine if redirection information for a registered class is included in the registration message, upon receipt of an incoming data message from the subnet; and
redirecting the incoming data message to a stored Local Identifier (LID) of the Class Manager for the registered class at the remote node, via the subnet, if redirection information for the registered class is included in the registration message.

9. The host node as claimed in claim 8, wherein the General Service Agent (GSA) is configured to provide management services, including basic initialization such as discovering fabric topology, assigning Local Identifiers (LID) to all ports that are connected to the subnet, programming switch forwarding tables and maintaining general functioning of the subnet to provide access to information such as data paths and alternate data paths between end nodes, topology change notifications and notification of events, including error detection, and recovery procedures.

10. The host node as claimed in claim 8, wherein the redirection information is part of a Management Datagram (MAD) including a ClassPortlnfo attribute used to indicate if redirection is supported at the host node and contain all information necessary to implement class redirection on the host node.

11. The host node as claimed in claim 8, wherein the incoming data message is dropped if redirection information for the registered class is not included in the registration message, and the host node has no Class Manager resident thereon to process the incoming data message.

12. The host node as claimed in claim 8, wherein the access module further comprises one or more Class Managers such as Subnet Administrator (SA), Name Services Manager, Baseboard Manager, IO Resource Manager (IORM), Device Manager, Vendor Specific Manager and Application Specific Manager for sending and receiving date messages on a special queue pair (QP1) known as General Service Interface (GSI) in accordance with the "InfiniBand™ Architecture Specification".

13. The host node as claimed in claim 8, further comprising:
a plurality of switches each of which stores the registration message including the Local Identifier (LID) of the Class Manager for a given class of general services downloaded from the host node, via the subnet, in Class redirection tables, and redirects the incoming data message to the stored Local Identifier (LID) of the Class Manager for the registered class at the host node, vias the subnet, from the Class redirection tables, if redirection information for the registered class is included in the registration message.

14. The host node as claimed in claim 13, wherein the Class redirection tables are implemented to hold redirection LID of a given class and to support a get and set operation on the Class redirection tables.

15. The host node as claimed in claim 9, wherein the General Services Agent (GSA) is provided for management services including a subnet administration service which provides data path information to reach fabric-attached devices; a communication management service which provides the means to set up and manage communications between queue pairs (QP); a performance management service which specifies a set of facilities for examining various performance characteristics of the subnet; a device management service which specifies the means for determining the type and location of various types of subnet-attached devices; a device configuration service which assigns subnet-attached devices to the host node; a baseboard management service which allows management of the subnet-attached devices; and a network protocol service which specifies mechanisms to support transport of Simple Network Management Protocol "SNMP" operations through the subnet.

16. A computer readable medium comprising instructions that, when executed by a host node in a switched fabric including end nodes and switches interconnected via links, cause the host node to implement class redirection by performing the steps of:
- storing a registration message including a Local Identifier (LID) of a Class Manager for a given class of general services from a remote node across the switched fabric, upon registration by the Class Manager;
- determining if redirection information for a registered class is included in the registration message, upon receipt of an incoming data message from the switched fabric; and
- redirecting the incoming data message to a stored Local Identifier (LID) of the Class Manager for the registered class at the remote node across the switched fabric, if redirection information for the registered class is included in the registration message.

17. The computer readable medium as claimed in claim 16, wherein the host node is a switch configured to store the registration message including the Local Identifier (LID) of the Class Manager for a given class of general services downloaded from the remote node across the switched fabric, in Class redirection tables, and redirect the incoming data message to the stored Local Identifier (LID) of the Class Manager for the registered class at the remote node across the switched fabric from the Class redirection tables, if redirection information for the registered class is included in the registration message.

18. The computer readable medium as claimed in claim 17, wherein the redirection information is part of a Management Datagram (MAD) including a ClassPortInfo attribute used to indicate if redirection is supported at the host node and contain all information necessary to implement class redirection on the host node.

19. The computer readable medium as claimed in claim 17, wherein the incoming data message is dropped if redirection information for the registered class is not included in the registration message, and the host node has no Class Manager resident thereon to process the incoming data message.

* * * * *